United States Patent [19]
McNinch, Jr. et al.

[11] 3,966,267
[45] June 29, 1976

[54] SKID CONTROL SYSTEM

[75] Inventors: Joseph H. McNinch, Jr., Oak Park; John A. Urban, Livonia; Gary L. Hopkins, Southfield, all of Mich.

[73] Assignee: Eaton Corporation, Cleveland, Ohio

[22] Filed: Nov. 29, 1974

[21] Appl. No.: 528,218

Related U.S. Application Data

[63] Continuation of Ser. No. 326,676, Jan. 26, 1973, abandoned.

[52] U.S. Cl. .............................. 303/21 BE; 303/20; 303/21 AF
[51] Int. Cl.² .......................................... B60T 8/02
[58] Field of Search ............... 188/181; 303/20, 21; 307/10 R; 317/5; 324/161–162; 340/53, 62

[56] References Cited
UNITED STATES PATENTS

| | | | |
|---|---|---|---|
| 3,545,817 | 12/1970 | Yarber | 303/21 P |
| 3,556,610 | 1/1971 | Leiber | 303/20 X |
| 3,578,819 | 5/1971 | Atkins | 303/21 BE |
| 3,586,385 | 6/1971 | Florus et al. | 303/20 X |
| 3,650,575 | 3/1972 | Okamoto | 303/20 X |
| 3,751,117 | 8/1973 | Soffer et al. | 303/21 EB |
| 3,768,872 | 10/1973 | Urban et al. | 303/21 BE |
| 3,863,993 | 2/1975 | Fleischer et al. | 303/21 BE |

*Primary Examiner*—Stephen G. Kunin
*Attorney, Agent, or Firm*—Teagno & Toddy

[57] ABSTRACT

A skid control system is provided for use with a vehicle having a pair of spaced apart wheels and having a braking system for applying braking forces to the wheels. A brake control circuit responds to a skid signal obtained from any one of a plurality of incipient detector circuits to act upon the braking system to release the braking forces. A delayed skid signal is provided whenever the difference in wheel speeds of the two wheels exceeds a given amount. A delayed skid signal is also provided if the average wheel speed of the two wheels decreases at a rate greater than a desired decreasing rate. If both wheels decelerate, a skid signal is provided upon sensing that the faster wheel is decelerating at a rate greater than a reference rate. As the wheels spin-up toward an ideal velocity for a braked vehicle, an acceleration detector serves to insure wheel roll up on low friction surfaces. If the wheels spin up at an acceleration greater than an acceleration level, the acceleration detector output is inhibited. If the acceleration is less than the preceding level and more than a second level, a skid signal is provided. Also, as the wheels spin-up to a desired velocity, braking forces are restored when the rate of acceleration declines below the second acceleration level. Monitoring circuits are provided for monitoring various operations of the skid control system and deactivate same when the operation is not within prescribed limits.

9 Claims, 4 Drawing Figures

SKID CONTROL SYSTEM

This is a continuation of application Ser. No. 326,676, filed Jan. 26, 1973, now abandoned.

This invention relates to the art of skid control systems for controlling braking forces applied to the wheels on a vehicle having a braking system, and, more particularly, to a skid control system for use with a vehicle having a pair of spaced apart wheels.

When a vehicle operator actuates the vehicle's braking system, braking forces are applied to the brake controlled wheels to slow the vehicle. The vehicle is preferably decelerated to a desired lower speed or to a stop condition, without a skid condition taking place. To prevent a skid condition, the vehicle should be decelerated with decreasing wheel speed which is slightly less than that of the vehicle. If, however, the wheel speed decreases at a rate substantially faster than that of the vehicle speed, then this is indicative of an impending wheel lock or skid condition. To prevent the wheel lock, skid control systems serve to sense this impending condition and release the brake forces. When the brake forces are released, the wheels are permitted to spinup toward the vehicle velocity. The braking forces are then restored to continue slowing the vehicle.

As a vehicle is being decelerated, a condition may arise where the wheel speed of one wheel being monitored by the skid control system is substantially different than that of the other wheel. This is normally indicative of a split coefficient of friction between the road surface and each of the two wheels. The slower wheel may be approaching a skid condition. Consequently, when the wheel speed difference becomes too great it is desirable to release the brake forces to prevent wheel lock up of the low speed wheel. However, the faster of the two wheels may still provide effective braking of the vehicle and it is frequently desirable, paticularly in a split coefficient of friction situation, that the braking forces applied to the faster wheel be continued for an added time duration even though the differential wheel speed exceeds the desired limits for differential wheel speed.

If both wheels being monitored by the skid control system are decelerated too fast, then this is indicative of an incipient wheel lock condition. Since the faster wheel produces less braking than the slower wheel, it is desirable to compare the deceleration of the faster wheel with a deceleration reference. If the deceleration of the faster wheel is greater than the reference the brake forces may be released.

Once an incipient skid condition has been sensed and the vehicle brake forces have been released, the vehicle wheels will be permitted to spin-up. It is known that the ideal wheel velocity for slowing a vehicle is below the vehicle's speed. During an incipient skid condition, the wheel velocity decreases substantially below this ideal velocity. Once the brake forces are released by an anti-skid system, the wheels are permitted to spin-up toward the ideal velocity and then the brake forces are permitted to be reapplied. On a dry surface, the coefficient of friction between the vehicle wheels and the surface is relatively high, and it has been determined that a spin-up rate on the order of 5g will quickly bring the wheels up to the ideal velocity and there is no need to keep the brakes off, since the wheels will probably reach the ideal velocity even if the brakes are applied. It is important that the wheel velocity does not overshoot the ideal velocity since this would tend to increase the vehicle stopping distance. Consequently, it is desirable to sense a high spinup rate, such as a 5g rate, and then permit brake reapplication so that the braking forces may take effect as the wheel speed approaches ideal wheel speed.

On low coefficient of friction surfaces, such as ice, the wheel spin-up rate will be between 0.5g and 5.0g which may allow a fixed bleed reference to fall too low to prevent wheel lock up. To correct this condition, it is desirable that the brakes be held off by the acceleration of the wheel, with the limits being 0.5g to 5.0g. On any surface the wheel acceleration will drop to zero as the wheels reach vehicle speed and with an acceleration logic, the brakes may be applied when the acceleration falls below 0.5g. In addition to the foregoing, it is further desirable that a skid control system be provided with monitoring circuits for monitoring various operating conditions of the skid control system to determine whether the operation is within prescribed limits. Thus, if the skid control system employs a voltage regulating circuit to provide regulated DC voltage to operate the skid detector circuits, erroneous indication of either an incipient skid condition or no skid incipient condition may result if the regulated voltage decreases in magnitude below a limit level. Also, the typical skid control system employs a valve solenoid which, when actuated, serves to act upon the vehicle's brake control system to release braking forces. This valve solenoid should not be energized when no incipient skid condition has been detected and it should be energized when the incipient skid condition has been detected. In addition, if a skid detector circuit provides a skid signal representative of an incipient skid condition for an unduly long time period, this may be indicative of a malfunction in the control system. If any such faulty operating condition takes place, it is desirable that the skid control system be, at least temporarily, deactivated.

It is therefore a primary object of the present invention to provide a skid control system which satisfies the above enumerated needs.

It is a specific object of the present invention to provide a skid control system which, upon noting that the wheel speeds of the two wheels being monitored by the skid control system exceeds a predetermined magnitude, provides a time delayed skid signal so that a slight delay is provided in releasing the brake forces, permitting additional braking forces to be applied to the faster wheel.

It is an additional object of the present invention to provide a skid control system to provide brake release when the average wheel speed of the two wheels being monitored by the skid control system decreases below a declining reference signal representative of a desired rate of decline in the speed of the faster wheel.

It is still further object of the present invention to provide a skid control system which serves to release braking forces applied to a pair of wheels being monitored by the skid control system are decelerating and, more particularly, when the faster of the two wheels decelerates at a rate greater than a reference deceleration.

A still further object of the present invention is to provide monitoring circuits for a skid control system to monitor the operation thereof and deactivate the anti-skid system when the operating characteristics are not within prescribed limits.

The present invention contemplates that the skid control system be used with a vehicle having at least a pair of spaced apart independently rotatable wheels and in which a braking system is provided for applying braking forces to the wheels. It is also contemplated that a brake control means be provided which responds to an applied skid signal for controlling the braking system to release the braking forces on the wheels. Still further, it is contemplated that sensor means provide first and second wheel speed signals having magnitudes respectively representative of the wheel speeds of the first and second spaced apart wheels.

In accordance with one aspect of the present invention, circuitry is provided for generating from the first and second wheel speed signals an average wheel speed signal having a magnitude respectively representative of the average speed of the first and second wheels. Also, circuitry is provided for comparing the average wheel speed signal with a reference signal to provide a skid signal whenever the magnitude of the average signal is less than that of the reference signal. The reference signal is obtained from a reference signal generating means which serves to provide a reference signal which decreases in magnitude when speed of the faster wheel decreases. The reference signal decreases from a magnitude having an initial value representative of the speed of the faster wheel and at a decay rate initially representative of a first deceleration rate. The reference signal generating means also includes circuitry for responding to a skid signal to vary the decay rate of the reference signal from the first rate to a second rate, representative of a slower rate of deceleration so that when the braking forces are released the wheel speed must increase to a higher velocity than that when the first decay rate is effective before the brakes may be reapplied.

In accordance with a further aspect of the present invention, logic circuitry serves to provide a skid signal when the wheel speed of one of the wheels differs from that of the other by a predetermined amount. The application of the skid signal to the brake control circuitry is delayed so that additional braking forces may be applied for a limited time to the faster rotating wheel.

In accordance with a still further aspect of the present invention, circuitry is provided for releasing the brake forces so that the wheels may spin-up to the vehicle velocity.

Still further in accordance with the present invention, monitoring circuitry is provided for monitoring at least one operational characteristic of the skid control system and inhibiting operation of the brake control circuitry so that the brakes will not be released if the monitored operating characteristics is not within desired operating limits.

BRIEF DESCRIPTION OF THE INVENTION

The foregoing objects and advantages of the invention will become more readily understood from the following description of the preferred embodiment of the invention taken in conjunction with the accompanying drawings which are a part hereof and wherein.

Figure 1:
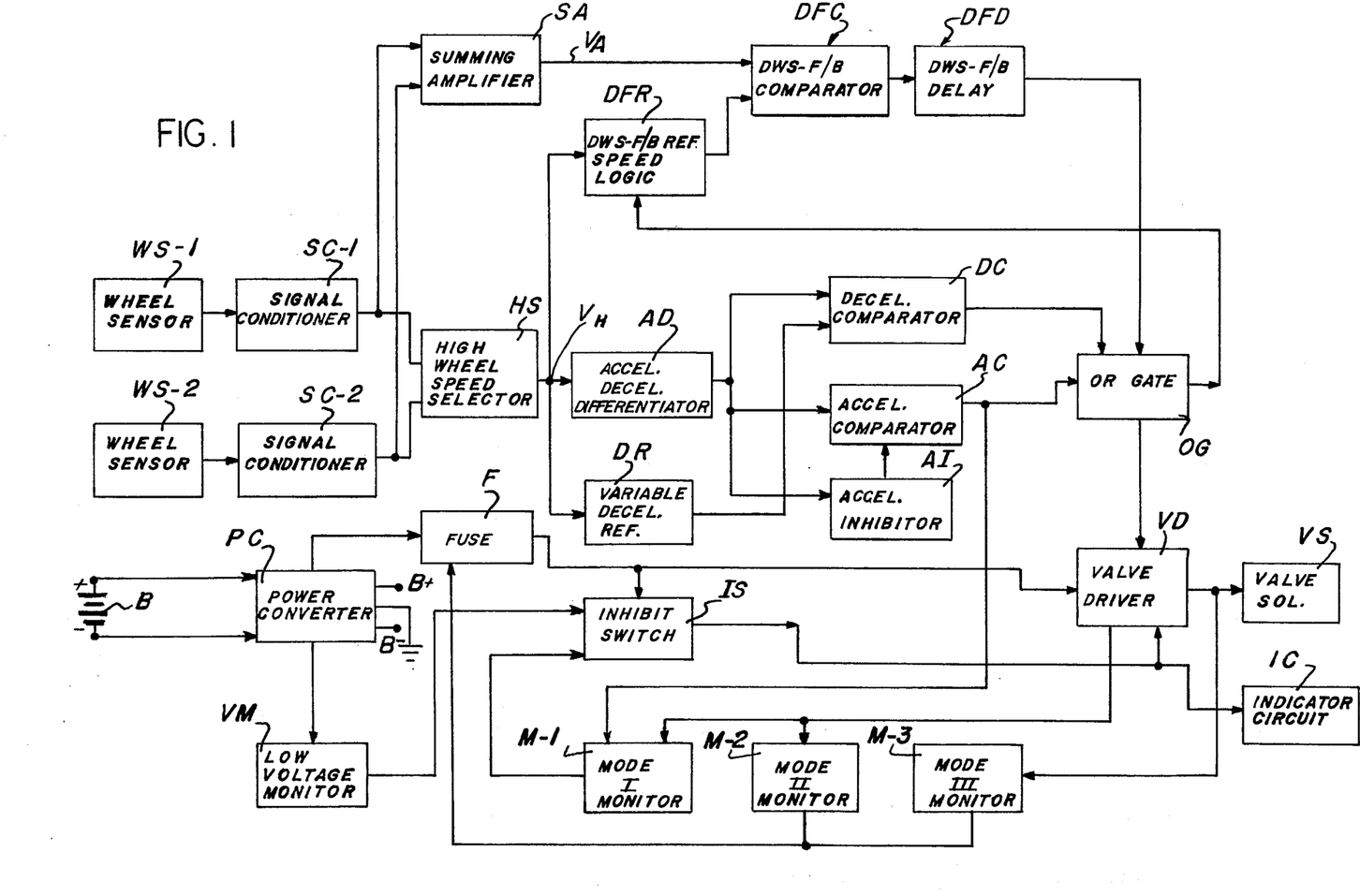
FIG. 1 is a block diagram illustration of the skid control system constructed in accordance with the present invention.

Referring now to the drawings wherein the showings are for purposes of illustrating a preferred embodiment of the invention only and not for purposes of limiting same, FIG. 1 is a block diagram illustration of the skid control system constructed in accordance with the present invention. It is contemplated that the skid control system as disclosed herein be used for controlling the brake forces applied to a pair of spaced apart wheels. Any number of axles may be controlled by applying a like plurality of the control systems, one for each axle.

Generally, the skid control system serves to monitor the wheel speed of the two wheels on the axle being controlled and develop a control signal, referred to hereinafter as a skid signal, if one or more conditions prevail indicative of an incipient or actual skid condition. The skid signal is used to actuate a valve driver circuit which, in turn, energizes a solenoid which acts on the braking system to relieve brake forces. The vehicle's brakes may be air pressure operated or hydraulic operated, and in either case it is contemplated that upon sensing an incipient skid condition, the brake forces on the wheels be relieved to prevent wheel lock-up. If, for example, differences in wheel speeds of the two wheels on the axle being controlled exceeds a reference level a skid signal is developed. A skid signal is also developed if the acceleration of the faster wheel on the monitored axle exceeds a reference level; however, if the acceleration continues and becomes greater than a second reference level the skid signal is removed. Also, if the deceleration rate of the faster wheel is greater than a reference level a skid signal is developed.

The reasons for and conditions causing a skid signal will be explained in greater detail hereinafter, it being the purpose at this point to indicate the general purpose of the skid control system.

Referring now to FIG. 1, the skid control system employs wheel sensors WS-1 and WS-2 for respectively sensing the wheel speeds of the two wheels on the axle being controlled. Any suitable mechanism may be employed for sensing wheel speed. Preferably, however, each wheel speed sensor includes a tachometer generator for developing an alternating signal having a frequency proportional to wheel speed. The frequency signals developed by sensors WS-1 and WS-2 are respectively applied to signal conditioner circuits SC-1 and SC-2. Each signal conditioner circuit includes a frequency to voltage converter for developing a DC signal having a magnitude proportional to the applied frequency signal and, hence, to the wheel velocity. Preferably, although not necessarily, the DC signal is of positive polarity. The wheel velocity signals $V_1$ and $V_2$ obtained from the signal conditioner circuits SC-1 and SC-2, respectively, are applied to both a summing amplifier SA as well as to a high wheel speed selector HS. The summing amplifier SA serves to provide an output signal which has a magnitude representative of the average wheel speed of the two wheels being monitored, whereas the high wheel speed selector HS determines which wheel exhibits the greater velocity and to provide an output signal representative of the magnitude of the speed of the faster wheel.

Figure 2:
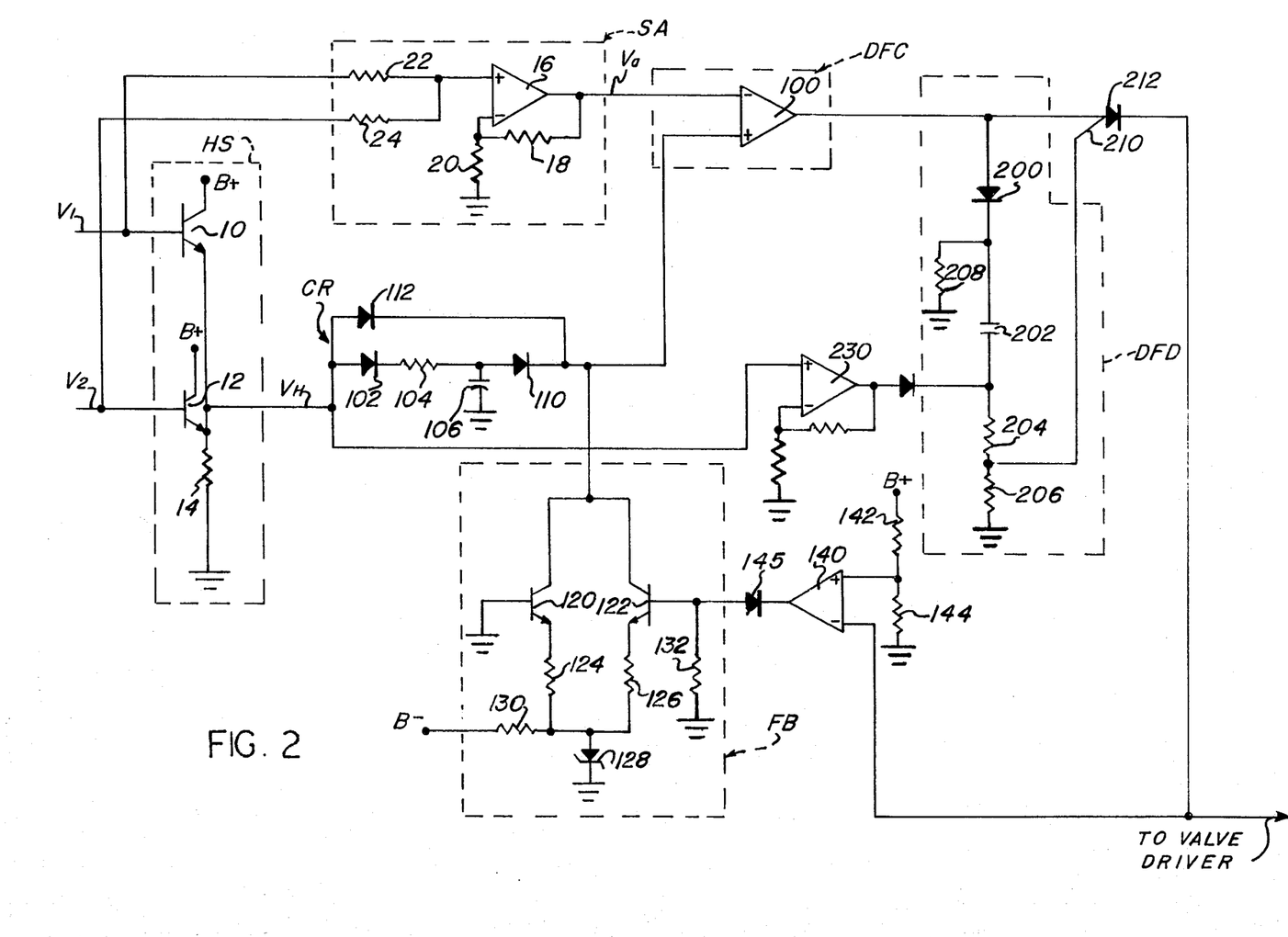
FIG. 2 is a schematic circuit diagram illustrating a portion of the circuitry of FIG. 1.

The high wheel speed selector HS is shown in greater detail in FIG. 2 and includes common emitter connected NPN transistors 10 and 12 each having their collectors connected to a B+ voltage supply source and their emitters connected in common through a resistor 14 to ground. The DC velocity signal $V_1$ is applied to the base of transistor 10 whereas the DC velocity signal $V_2$ is applied to the base of transistor 12. Consequently, the output signal $V_H$ is proportional to the speed of the higher velocity wheel less a small drop.

The summing amplifier SA is also illustrated in greater detail in FIG. 2 and includes an operational amplifier 16 having a feedback network including resistors 18 and 20. The wheel velocity signals $V_1$ and $V_2$ are respectively applied through summing resistors 22 and 24 to the noninverting input of amplifier 16. Consequently, the amplifier serves to provide a positive DC output signal having a magnitude equal to the average of the input signals $V_1$ and $V_2$ times the gain (1.5) of the amplifier, as dictated by feed back resistors 18 and 20.

ACCELERATION — DECELERATION CIRCUITRY

As shown in FIG. 1, the higher wheel speed signal $V_H$ obtained from the high wheel speed selector $H_S$ is applied to an acceleration-deceleration logic circuit AD as well as to a variable deceleration reference circuit DR. Briefly, circuit AD serves to differentiate the high speed signal $V_H$ to provide an output signal representative of rate of velocity change. As will be brought out in greater detail hereinafter, the rate of change output signal is in a positive direction as vehicle wheel speed decreases, and is in a negative direction as the wheel speed increases. The positive, or deceleration, signal is applied to a deceleration comparator circuit DC which serves to compare the deceleration signal with a variable deceleration reference signal obtained from circuit DR. If the deceleration signal exceeds the reference signal then the deceleration comparator circuit DC provides a high or binary "1" output signal which is applied through OR gate OG to actuate the valve driver circuit VD. The valve driver circuit, in turn, actuates a valve solenoid VS to relieve the brake forces.

Similarly, the negative or acceleration signal obtained from circuit AD is applied to an acceleration comparator AC where the acceleration signal is compared with a reference signal. If the acceleration is greater than the reference signal comparator AC provides a skid signal in the form of a binary 1 signal which is applied through OR gate OG to actuate valve driver circuit VD. As will be brought out in greater detail hereinafter, the acceleration comparison is a two-stage comparison in that a skid signal is developed when the acceleration signal obtained from circuit AD exceeds a level representative of 0.5g. If, however, the acceleration increases sufficiently to attain a level representative of 5.0g then an acceleration inhibitor circuit AI responds to this condition to inhibit comparator AC from providing a skid signal. The circuitry to accomplish the foregoing acceleration and deceleration comparison functions is illustrated in greater detail in FIG. 3, to which reference is now made.

Figure 3:
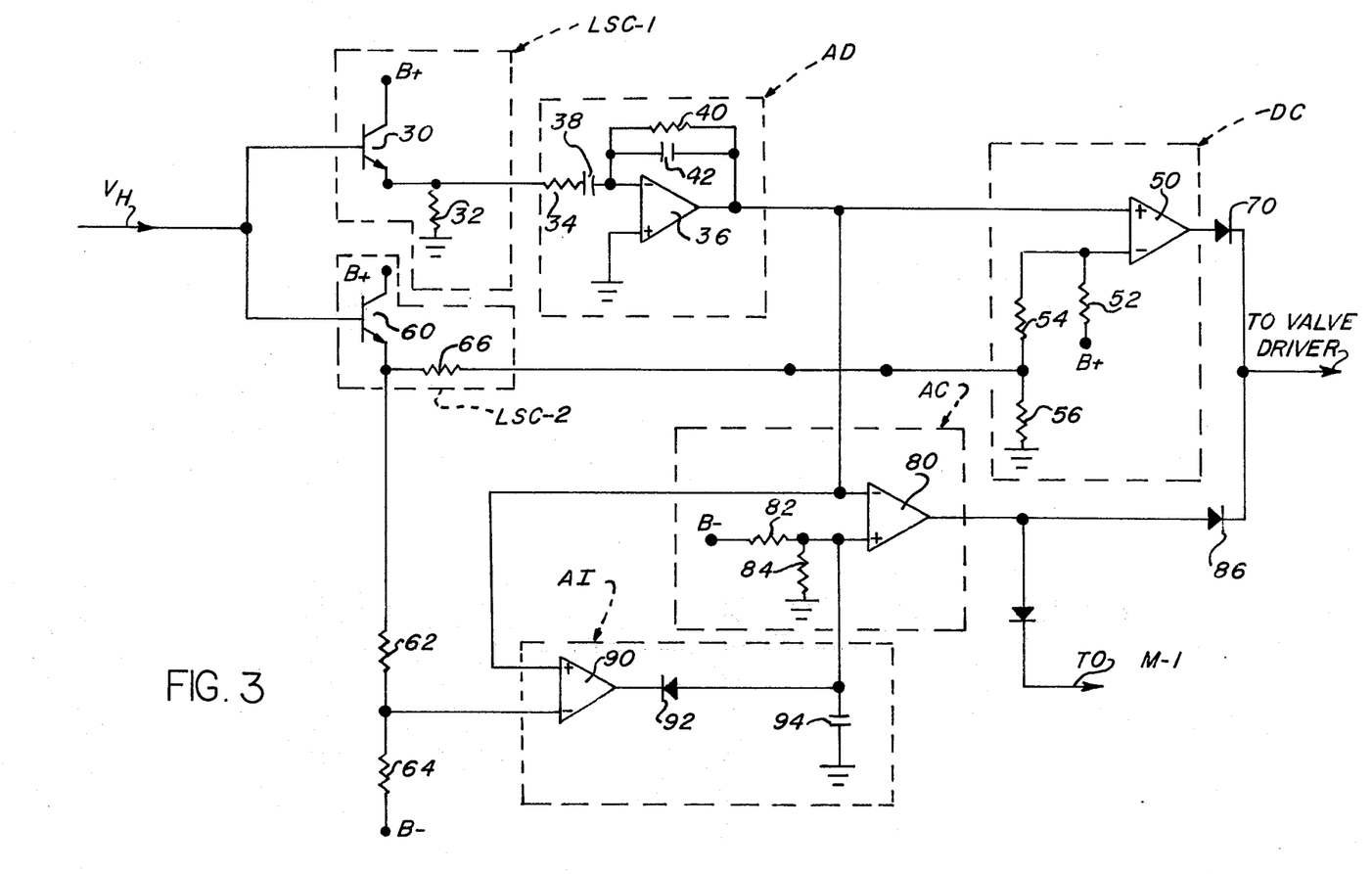
FIG. 3 is a schematic circuit diagram illustrating other portions of the circuitry of FIG. 1; and, FIG. 4 is a schematic illustration showing still further portions of the circuitry of FIG. 1.

The high speed signal VH obtained from the high wheel speed selector HS is applied to the base of an NPN transistor 30 in a low speed cutoff circuit LSC-1. The emitter of transistor 30 is connected to ground through a resistor 32. Transistor 30 serves as an emitter-follower with unity gain. Since it does not conduct below the base-emitter threshold voltage, the derivative circuits are inactive for speeds below this threshold voltage, i.e., under 5 miles per hour. Above this speed, the output voltage from the low speed cutoff circuit is applied to the inverting input of an operational amplifier 36 through resistor 34 and a capacitor 38, in the acceleration-deceleration logic circuit AD. A feedback resistor 40 is connected between the output of the amplifier and its inverting input. Capacitor 38 and resistor 40 provides a differentiation path and a capacitor 42, connected in parallel with resistor 40, serves in conjunction with resistor 34 to provide immunity to high frequency noise. The output signal from amplifier 36 varies in proportion to the rate of change of the velocity of the faster wheel. The signal varies in a positive sense as wheel speed decreases and varies in a negative sense as wheel speed increases.

The output signal from circuit AD is applied to the noninverting input of an operational amplifier 50 in the deceleration comparator circuit DC. The reference signal applied to the inverting input of operational amplifier 50 is comprised of a fixed level and a velocity variable level. The fixed level is obtained from a voltage divider network made up of resistors 52, 54 and 56 connected together in series between a B+ voltage supply source and ground. The velocity variable level is obtained from a second low speed cutoff circuit LSC-2 which includes an NPN transistor 60 having its base connected to receive the high speed signal $V_H$ and its collector connected to a B+ voltage supply source. The emitter of transistor 60 is connected through series connected resistors 62 and 64 to a B— voltage supply source. Consequently, above a low speed level, such as 5 miles per hour, the output signal obtained from the low speed cutout circuit LSC-2, through resistor 66, is proportional to the speed of the faster wheel. Resistors 66 and 56 serve as a voltage divider for this signal which is then applied through resistor 54 to the inverting input of the operational amplifier. When the deceleration signal applied to the noninverting input of amplifier 50 becomes greater, in a positive sense, than the variable reference signal applied to the inverting input, amplifier 50 will provide an output skid signal in the form of a positive or binary 1 signal. This positive skid signal is applied through a diode 70, poled as shown, to actuate the valve driver VD. This will energize the solenoid valve VS to relieve the brake forces on the wheels, permitting them to spin-up toward the vehicle velocity.

As the wheels spin-up, circuit AD provides a negative going acceleration signal representative of the spin-up rate. This spin-up rate is monitored by acceleration comparator AC to provide a skid signal for brake release for acceleration rates between 0.5g and 5.0g. The acceleration produced signal is therefore ignored when the wheels spin-up at a rate greater than 5.0g. This is desirable to offset electrical and pneumatic system delays so that the wheel does not overshoot the ideal velocity for braking. But, the spin-up should not cause the wheel velocity to overshoot that ideal level. It has been determined that a spin-up rate of over 5.0g is indicative of a fast wheel speed recovery and, unless the acceleration produced skid signal is removed, the wheel speed may overshoot the desired level. For this reason, the acceleration comparator is programmed to remove its generated skid signal at the 5g spin-up rate. But, on a low coefficient of friction surface, such as ice, the wheel spin-up rate may never exceed 5.0g and as the wheels approach vehicle speed the spin-up rate will fall off to zero, the brakes being applied when the rate is 0.5g. Therefore, below this acceleration rate the acceleration comparator does not provide a skid signal.

The output signal from circuit AD is applied to the inverting input of an operational amplifier 80 in the acceleration comparator circuit AC. Here the negative going acceleration signal is compared with a fixed reference taken from a voltage divider consisting of resistors 82 and 84 connected between ground and a B—voltage supply source. The junction of resistors 82 and 84 is connected to the non-inverting input of amplifier 80. Consequently, a fixed reference is defined and the values of the resistors are chosen such that the fixed reference is representative of an acceleration level of 1.5g. When the acceleration signal attains a level such that it is more negative than the reference signal, then amplifier 80 will provide a skid signal in the form of a positive or binary 1 signal and this is applied through a diode 86, poled as shown, to actuate the valve driver VD to cause the brake forces to be released.

The positive skid signal provided by acceleration comparator AC will be inhibited if the acceleration signal increases beyond a higher reference level, preferably on the order of 5.0g. The acceleration inhibit circuit AI serves, when this condition is sensed, to remove the positive skid signal to permit brake reapplication. The acceleration inhibit circuitry is illustrated in FIG. 3, to which reference is now made.

The acceleration signal obtained from circuit AD is applied to the noninverting input of an operational amplifier 90 in the acceleration inhibit AI. The acceleration signal is compared against a reference signal applied to the inverting input of operational amplifier 90. The reference signal is obtained from the voltage divider comprised of resistors 62 and 64 and is made speed dependent by its inter-connection with the low speed cutoff circuit LSC-2. When the acceleration signal exceeds the reference signal, i.e., it becomes more negative than the reference signal, the output of amplifier 90 will change from a high level to a low level so as to forward bias a diode 92, poled as shown, connected in its output circuit. This diode forces the input to the noninverting input of amplifier 80 in the acceleration comparator circuit AC to become more negative and thereby prevent the output circuit of amplifier 80 from carrying a positive skid signal. Capacitor 94 connected between ground and the junction of diode 92 and the noninverting input of amplifier 80 serves, in conjunction with resistor 84, to provide an RC time delay to return the acceleration reference signal to its normal level once the output of amplifier 90 has returned to its normal high level. Consequently, so long as the acceleration signal is greater than the fixed reference for the acceleration comparator circuit AC, but less than the reference signal for the acceleration inhibitor circuit AI, a positive skid signal is provided and this signal is applied through diode 86 in OR gate OG to actuate the valve driver VD.

DIFFERENTIAL WHEEL SPEED-FIXED BLEED CIRCUITRY

The average wheel speed signal VA obtained from the summing amplifier SA is applied to a differential wheel speed fixed bleed comparator DFC. This comparator has two different modes of operation. In one mode it compares the two wheel speeds on the axle being controlled, and if the speed of one wheel exceeds that of the other by a fixed amount a positive skid signal is transmitted to the valve driver VD through a time delay network DFD and OR gate OG. In the second mode of operation, comparator DFC serves to compare the average wheel speed (times a gain of 1.5 as dictated by the gain of amplifier SA) with a reference signal having a two stage decay rate. As will be developed in greater detail hereinafter, the decay rate is dependent on the state of the logic circuitry and initially presents a high decay rate followed by a slow decay rate, respectively representative of high and low decelerations.

The first mode of operation takes place whenever the high speed signal VH, representative of the speed of the faster wheel on the axle being controlled, is constant, or is decreasing at a rate less than the first stage delay rate referred to above. With reference to the circuitry illustrated in FIG. 2, the comparator DFC includes an operational amplifier 100 having its inverting input connected to summing amplifier SA to receive the average wheel speed signal VA. The noninverting input of operational amplifier 100 is connected to the output side of a computed speed reference circuit CR which has its input circuit connected to receive the high velocity signal VH from the high wheel speed selector HS. The computed speed reference circuit CR serves to provide a reference signal essentially equal to high velocity signal VH less a diode drop. This is accomplished by applying the high speed signal VH through a diode 102 and a resistor 104 to charge capacitor 106. The capacitor 106 is thereby charged to a level representative of the speed of the faster wheel, less the voltage drop through the charging circuit. Reference circuit CR also includes a diode 110 in the discharge circuit of capacitor 106 together with a diode 112 connected across the series connected circuitry comprised of diode 102, resistor 104 and diode 110. Consequently, at constant speed or during acceleration the voltage at the junction of diode 110 and diode 112, serving as the output of reference circuit CR, is equal to or greater than the voltage stored by capacitor 106. The reference signal applied to the noninverting input of operational amplifier 100 is essentially equal to that of the faster wheel speed VH less the voltage drop across diode 112.

If one of the wheels is rotating substantially faster than the other wheel by a sufficient amount, then the average speed signal VA will be less than the reference signal and, hence, amplifier 100 will serve to provide a positive skid signal. This skid signal is delayed in time by delay circuit DFD before being applied through OR gate OG to actuate the valve driver VD to release the brake forces. This mode of operation ensues so long as the faster wheel speed VH is constant or increasing or is decreasing at a rate less than a predetermined rate.

The second mode of operation of comparator DFC comes into play once the circuitry senses that the faster wheel speed VH is decreasing at a rate greater than a predetermined rate. That is, once the circuitry senses that the faster of the two wheels is decelerating, capacitor 106 will discharge through diode 110 with the discharge rate being controlled by a two stage, fixed bleed circuit FB. The discharge rate of capacitor 106 is controlled in two states so that it initially decays at a rate representative of a percentage of the speed of the faster wheel decreasing at a rate of 1.0g. This is accomplished by limiting the discharge current with a pair of constant drain NPN transistors 120 and 122 in the fixed bleed circuit FB. NPN transistors 120 and 122 have their collectors connected together in common and thence to the junction of diodes 110 and 112. The emitters of the two transistors are connected through resistors 124 and 126 terminating in a common connection and then through a Zener diode 128, poled as shown, to ground, as well as through a resistor 130 to a B-voltage supply source. The base of transistor 120 is connected to ground whereas the base of transistor 122 is connected to ground through a resistor 132. Consequently, both transistors are normally forward biased to drain discharge current from capacitor 106 through the parallel current drain paths provided by the two transistors at a controlled decay rate of 1g. Hence, the computed speed reference signal applied to the noninverting input of amplifier 100 will decay from an initial level, representative of the speed of the faster wheel before that wheel decelerated, at a fast decay rate, on the order of 1g, representative of a maximum brake controlled deceleration rate to be permitted before the brake forces are released.

If the average wheel speed signal VA decreases sufficiently fast then its magnitude will become less than the decaying reference signal and operational amplifier 100 will provide a positive skid signal. The signal, however, is delayed by delay circuit DFD before application through OR gate OG to actuate valve driver VD to relieve the brake forces. This time delay permits the faster wheel to be braked for a longer duration before the brake forces are released in response to the skid signal.

The delayed skid signal or any skid signal is used to actuate the fixed bleed circuit FB to its second stage so that the discharge rate of capacitor 106 iis decreased from a 1g decay rate to 0.5g decay rate. This is accomplished by a feedback network wherein the positive skid signal is applied to the inverting input of an operational amplifier 140. The noninverting input for amplifier 140 is held at a fixed reference level from a voltage divider including resistors 142 and 144 connected between ground and a B+ voltage supply source. The positive skid signal is sufficiently positive relative to the reference level to cause the output of amplifier 140 to be switched to a low level. This level change at the output of amplifier 140 serves to reverse bias transistor 122 through a diode 145.

When transistor 122 is reversed biased and non-conductive, the current drain is provided only by transistor 120 and, consequently, the discharge rate of capacitor 106 is limited to a deceleration rate of 0.5g, as determined by the drain effect of transistor 120 and resistor 124. If, during this second stage of operation, the average wheel speed decreases so that the average wheel speed signal VA becomes less than the reference signal, which is decaying at a 0.5g rate, then comparator DFC will again provide a positive skid signal. This skid signal, like that developed during the first stage, is delayed by time delay circuit DFD before being applied through OR gate OG to actuate the valve driver VD to release the brake forces.

The purpose of the second stage of the two stage fixed bleed circuit is to control the time of reapplying the brakes and not for controlling the time of releasing the brakes. Thus, after a skid has started and the brakes are released and second stage of the fixed bleed will become operative. The second stage mode serves to delay the time of reapplying the brakes to a later point in time than that which would occur had the decay rate of the first stage remained in effect. Thus, a vehicle operator may, upon actuating the vehicle brakes, decelerate the vehicle at a rate of 0.8g and there may be no need for the anti-skid system to provide brake release. If the 0.5 decay rate had been in operation at this point a skid signal would have been developed to provide unnecessary brake release. Once, however, a skid condition commences brake release should be effected. Regardless of which of the circuits disclosed herein senses an incipient skid condition and provides a positive skid signal, the fixed bleed circuit will be reconnected for its second stage mode of operation (0.5g decay rate). When the brakes have been released and the wheels start to spin-up again to recover from an incipient wheel lock condition, they must spin-up to a somewhat higher velocity to reach the 0.5g decay rate reference signal than the 1.0g decay rate reference signal. Consequently, the second stage of the fixed bleed circuit reapplies the brakes at a higher wheel speed which is closer to the ideal speed.

This function is especially helpful on a low coefficient surface, such as ice. The second stage of the fixed bleed circuit also extends the time available for brake actuator exhaust and start of wheel spin-up when the wheels are locked momentarily on low friction surfaces, such as ice.

The differential wheel speed, fixed bleed circuitry is particularly useful in a split coefficient of friction condition. In such a condition the faster vehicle wheel may have more braking effect than the slower wheel, if the faster wheel is not free wheeling. The difference in wheel speed may be sufficient for comparator DFC to provide a skid signal. It has been determined that the stopping distance may be decreased by delaying the release of the brakes to allow time for the faster wheel to decrease to the ideal velocity. This delay increases the brake torque on the high friction wheel and is provided by the time delay circuit DFD which, as will be developed hereinafter, delays application of the skid signal to the valve driver for 0.1 second.

DIFFERENTIAL WHEEL SPEED-FIXED BLEED TIME DELAY

Time delay circuit DFD serves to provide a time delay on the order of 0.1 second for the skid signal obtained from the differential wheel speed comparator DFC. The positive skid signal provided by comparator DFC is applied to time delay circuit DFD which includes a diode 200 connected in a series circuit with time delay capacitor 202 and series connected resistors 204 and 206. A resistor 208 is connected in parallel with the series of capacitor 202 and resistors 204 and 206. The junction of resistors 204 and 206 is connected to the gate 210 of a gated semiconductor 212 having its anode connected to the output of operational amplifier 100. This semiconductor will not be conductive to pass the positive skid signal unless the voltage applied to its anode is greater in a positive sense, than that applied to its gate. Consequently, when capacitor 202 has discharged sufficiently to drop the gate voltage below the anode voltage, semiconductor 212 will conduct to transmit the positive skid signal to the valve driver VD. This time delay is preferably on the order of 0.1 second, as determined by the RC charging circuit.

The time delay circuit DFD is speed sensitive in that at low speeds, such as 5 miles per hour or less, the time delay is essentially 0, whereas at high speeds from 20 miles per hour and above the time delay is on the order of 0.1 seconds. This is accomplished by applying the high speed signal $V_H$ to amplifier 230 to the junction of capacitor 202 and resistor 204. In the time delay circuit a logic signal causes the junction of capacitor 202 and resistor 204 to instantaneously step up which in turn raises the gate voltage of semiconductor 212. If the initial voltage of the junction is at zero volts, the step does not raise the gate voltage high enough to make the semiconductor nonconducting. If, however, the junction is at some positive voltage, the step, which is of a constant value, will cause the gate voltage to instantaneously exceed the anode voltage. As the capacitor discharges the gate voltage will fall and at some time will drop below the anode voltage. It is this initial voltage which is set by the speed signal.

VALVE DRIVER-MONITOR CIRCUITRY

The valve driver VD serves to receive a positive skid signal from OR gate OG and then energize valve solenoid VS to provide brake release. OR gate OG is comprised of diodes 70, 86 and semiconductor 212, having their cathodes connected in common. Valve solenoid VS is energized for a time duration dependent upon the duration of the skid signal. An inhibit switch IS serves to prevent energization of valve driver VD when certain system operating failure conditions occur. In addition, in the embodiment illustrated in FIG. 1, a fuse F located in the energizing circuit for the valve driver VD is blown when certain of these failure conditions occur.

In accordance with the embodiment of the invention illustrated herein, four system failure conditions are monitored:

1. A low output voltage from the power regulator will disable the valve driver. Normal operation of the valve driver is restored when the voltage returns to normal.
2. A skid signal from OR gate OG for a time duration greater than 1 second, unless a skid signal is provided within this time from the acceleration comparator circuit AC, will disable the valve driver. Normal operation of the valve driver is restored when the skid signal from OR gate OG terminates.
3. A skid signal from OR gate OG for a time duration in excess of 6 seconds will cause the fuse to blow, permanently disabling the valve driver.
4. Loss of valve solenoid continuity or operation of the solenoid in the absence of a skid signal will cause the fuse to blow, permanently disabling the valve driver.

The above functions are performed by the circuitry shown in block diagram in FIG. 1. The voltage regulator or power converter PC serves to provide regulated B+ and B− voltage for the skid control circuitry. The power converter may take the form of various well known voltage regulating circuits for providing regulated B+ and B− voltage from a battery B. In addition, operating power for the valve driver is obtained from the power converter through a fuse F.

A low voltage monitor VM serves to monitor the output from the power converter PC and, when the voltage becomes too low, an inhibit switch IS is actuated to inhibit operation of the valve driver VD and energize an indicator circuit IC. A Mode-1 monitor circuit M-1 serves to monitor the valve driver circuit VD for a skid signal existing for more than one second without a skid signal being developed by acceleration comparator AC and actuate the inhibit switch IS to inhibit operation of valve driver VD as well as to energize the indicator circuit IC.

The fuse F is blown in response to conditions monitored by Mode-2 and Mode-3 monitor circuits. Monitor circuit M-2 serves to monitor the valve driver VD and, if a skid signal exists for a period greater than 6 seconds, fuse F will be blown. similarly, monitor circuit M-3 monitors the operation of the valve solenoid VS and if there is a loss of solenoid continuity or if the solenoid operates without presence of a skid signal, circuit M-3 will cause fuse F to be blown. The circuitry for obtaining the foregoing functions is illustrated in detail in FIG. 4.

Figure 4:
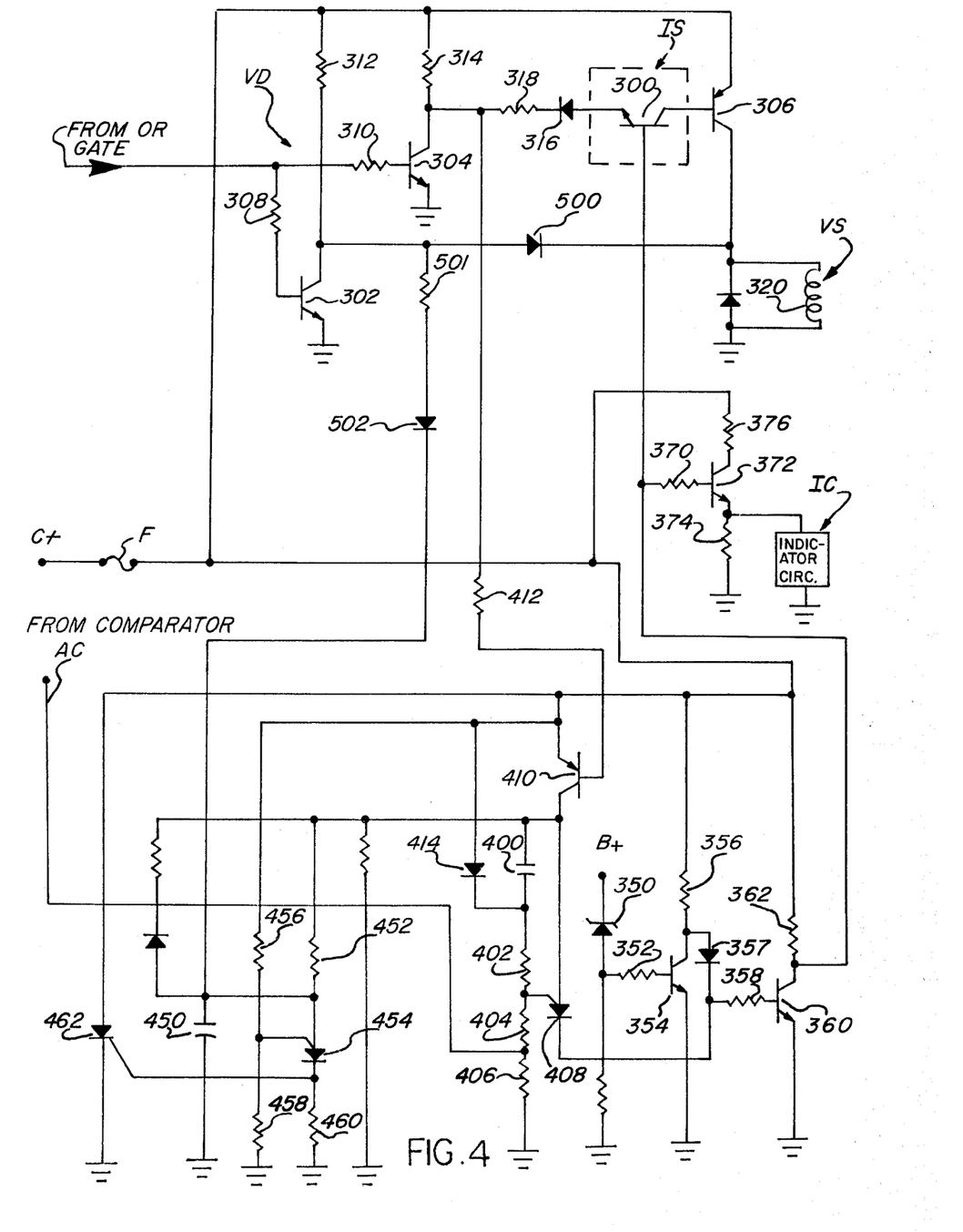

The valve driver VD and inhibit switch IS are shown in detail in the upper portion of FIG. 4, to which reference is now made. Inhibit switch IS is comprised of an NPN transistor 300 which is normally held conductive. The valve drive circuit VD includes NPN transistors 302, 304 and a PNP transistor 306. A positive skid signal received from OR gate OG is applied to the base of transistor 302 through a resistor 308 and to the base of transistor 304 through a resistor 310. The skid signal will forward bias transistor 302 into conduction from the C+ voltage supply source through resistor 312. Similarly, the skid signal will bias transistor 304 into condition. When transistor 304 conducts, it draws current through the emitter to base circuit of transistor 306 through the collector to emitter circuit of transistor 300 and, thence, through a diode 316 and a series connected resistor 318. Consequently, transistor 306 is forward biased into conduction to provide current flow through its emitter to collector circuit and thereby energize the valve solenoid coil 320. When the positive skid signal is removed from the output of OR gate OG, transistors 302 and 304 become reversed biased. This causes diode 316 to become reversed biased through resistor 314, preventing emitter base conduction of transistor 306. Consequently, transistor 306 becomes nonconductive to deenerigize the solenoid coil 320.

Normally the inhibit switch transistor 300 is forward biased. However, in the event a system failure condition is sensed by the low voltage monitor circuit VM or the Mode-1 monitor circuit M-1, this transistor will be reverse biased to prevent conduction of transistor 306 and thereby prevent energization of the valve solenoid coil 320. Since operating power for transistor 306 is obtained from the C+ source, the transistor is also reversed biased whenever fuse F is blown by monitor circuit M-2 or M-3.

LOW VOLTAGE MONITOR CIRCUIT

The low voltage monitor circuit VM serves to monitor the output voltage of the power converting circuit PC. The circuitry is shown in the lower portion of FIG. 4 and generally includes a Zener diode 350 having its cathode connected to the B+ output terminal of the power converter and its anode connected through a resistor 352 to the base of an NPN transistor 354. The collector of transistor 354 is connected through a resistor 356 to the C+ output voltage terminal of the power converter PC. The C+ output voltage of the power converter may be obtained across the input stage of the regulator, which typically includes a full wave rectifier and a smoothing capacitor. The C+ voltage is then applied to regulating circuitry which obtains the regulated B+ and B− voltages. The B+ regulator voltage applied to the cathode of Zener diode 350 is normally greater than the Zener breakdown voltage and the Zener diode conducts to hold transistor 354 in a conductive condition. Consequently, the collector of transistor 354 is essentially at ground potential and, through resistor 358, serves to maintain NPN transistor 360 reverse biased. However, if the regulated B+ voltage decreases sufficiently the Zener diode 350 will no longer conduct and transistor 354 will become nonconductive. Since the collector of this transistor is referenced to the C+ voltage source through resistor 356, the collector of the transistor is sufficiently positive to bias transistor 360 into conduction through diode 357 and resistor 358. The base of inhibit switch transistor 300 is normally held at a positive level to forward bias the transistor through resistor 362 to the C+ voltage supply source. However, when transistor 360 is forward biased into conduction its collector is referenced to ground potential to reverse bias transistor 300.

When transistor 360 is forward biased into conduction to disable the valve driver circuit through inhibit switch IS, it also causes energization of the indicator circuit IC. The collector of transistor 360 is connected through a resistor 370 to the base of NPN transistor 372 having its emitter connected through a resistor 374 to ground, as well as to the indicator circuit IC. The collector of this transistor is also connected through a resistor 376 to the C+ voltage supply source through fuse F. Normally, transistor 372 is maintained in conduction and, in this state, the indicator circuit IC is not energized. However, when transistor 360 becomes forward biased and conductive it reverse biases transistor 372 through its base resistor 370. It is this reverse biased or nonconductive condition of transistor 372 that causes the indicator circuit IC to provide a suitable indication or alarm. The indicator circuit IC is not shown in detail, however, it is to be understood that the indication to be provided is obtained when transistor 372 becomes reverse biased and nonconductive and not when the transistor is forward biased and conductive. Any suitable indicator circuit may be employed for this purpose.

BRAKE RELEASE SIGNAL GREATER THAN ONE SECOND

The Mode-1 monitor circuit M-1 is also incorporated in the circuitry shown in the lower portion of FIG. 4. This circuit serves the function of disabling the valve driver and actuating the indicator circuit if a skid signal exists for a period exceeding one second, providing that a skid signal from the acceleration comparator circuit AC is not provided during the interim period. The Mode-1 monitor circuit M-1 includes a timing capacitor 400 connected in series with resistors 402, 404 and 406. The junction of resistors 402 and 404 is connected to the gate of a gate controlled semiconductor 408. The anode of semiconductor 408 is connected to the collector of a PNP transistor 410. Normally, with no skid signal, transistor 410 is reverse biased by a positive voltage applied to its base through resistor 412. Also, the junction of capacitor 400 and resistor 402 is referenced to a positive level through diode 414. However, on receipt of a positive skid signal transistor 304 is biased into conduction and its collector provides essentially a ground potential through resistor 412 to the base of transistor 410. This transistor is thus forward biased into conduction. As the collector of transistor 410 becomes positive the junction of capacitor 400 and resistor 402 instantaneously becomes more positive then capacitor 400 discharges through resistors 402, 404 and 406. Once the potential developed across resistors 404 and 406 decreases sufficiently that the gate voltage for semiconductor 408 falls below that of its anode voltage, the semiconductor 408 conducts transmitting a positive signal through resistor 358 to forward bias transistor 360 into conduction. As previously discussed, when this transistor is forward biased into conduction its collector voltage is essentially that of ground potential and this causes indicator circuit IC to become energized as well as to disable the valve driver circuit VD through the inhibit switch IS.

During the above operation the time delay required for capacitor 400 to discharge sufficiently to bias transistor 408 into conduction is on the order of one second, as determined by the RC discharge path. If, during the interim time period, a skid signal is developed by the acceleration comparator AC, then a positive signal is applied to the junction of resistors 404 and 406. This raises the voltage developed across resistors 404 and 406 sufficient to prevent the gate voltage for semiconductor 408 from becoming less than the anode voltage, and, hence, conduction of semiconductor 408 is inhibited.

BRAKE RELEASE SIGNAL GREATER THAN SIX SECONDS

The Mode-2 monitor circuit M-2 serves to cause fuse F to blow if a skid signal lasts for a time duration greater than 6 seconds. The circuitry to accomplish this function is shown in the lower portion of FIG. 4 and includes a timing capacitor 450. When the voltage driver circuit VD receives a positive skid signal, transistor 304 is biased into conduction. Consequently, the potential at the collector of this transistor becomes essentially that of ground potential and this is relayed through resistor 412 to forward bias transistor 410 into conduction. With transistor 410 being forward biased into conduction its emitter to collector current will flow through resistor 452 to charge capacitor 450. When the charge on capacitor 450 is sufficient that the potential applied to the anode of semiconductor 454 exceeds that on its gate, as derived from the junction of a voltage divider consisting of resistors 456 and 458, the semiconductor will be forward biased into conduction to develop a gating potential across its load resistor 460. This serves to gate silicon controlled rectifier 462 into conduction, essentially presenting a short circuit across fuse F. This blows the fuse, permanently disabling the valve driver circuit VD. This also actuates inhibit switch IS, causing energization of the indicator circuit IC. The time required for the voltage on capacity 450 to attain a level sufficient to cause semiconductor 454 to conduct is preferably on the order of 6 seconds, as determined by the RC time constant of its charging circuit.

VALVE DRIVER OPERATION - SOLENOID CONTINUITY

In normal operation, with no positive skid signal applied to the valve driver circuit VD, the collector of transistor 302 is held at essentially ground potential through a diode 500, poled as shown, connected in series with the valve solenoid coil 320 to ground. The collector of transistor 302 is also held at essentially ground potential whenever the transistor is forward biased during receipt of a positive skid signal. However, if through a malfunction or the like transistor 306 permits current flow to energize valve solenoid coil 320 when no positive skid signal is provided diode 500 will become reverse biased. Consequently, the collector potential of transistor 302 will become positive as referenced through its collector resistor 312 to the positive voltage source. Consequently, capacitor 450 will charge through resistor 501 and diode 502. When the voltage across capacitor 450 is sufficient that the anode potential is greater than the gate potential of semiconductor 454, this semiconductor will conduct. A triggering voltage is developed across load resistor 460 to trigger silicon controlled rectifier 462 into conduction. Silicon controlled rectifier 462 will the present essentially a short circuit across fuse F. This will cause the fuse to blow, permanently disabling the valve driver circuit VD. Also, this will cause inhibit transistor 300 to become reverse biased and also cause the indicator circuit IC to become energized.

If, for some reason, there is a break in the solenoid energizing circuit, no ground return path will be provided through diode 500. The collector of transistor 302 will become positive and cause capacitor 450 to charge through resistor 501. Once the capacitor is charged sufficiently, semiconductor 454 will conduct to develop a trigger voltage across its load resistor 460 and trigger silicon controlled rectifier 462 into conduction, causing fuse F to blow.

Whereas the invention has been described in conjunction with a preferred embodiment it is to be appreciated that the invention is not limited to same as various modifications and arrangement of parts may be made without departing from the spirit and scope of the present invention as defined by the appended claims.

What is claimed is:

1. A skid control system for use with a vehicle having at least first and second spaced apart independently rotatable wheels and having a braking system for applying braking forces to said wheels and comprising:
   brake control means responsive to a skid signal for controlling said braking system to release the braking forces on said wheels;
   means for providing first and second wheel speed signals of magnitudes respectively representative of the wheel speeds of said first and second wheels;
   logic circuit means for providing a skid signal when the acceleration rate of the faster of said wheels exceeds a predetermined positive acceleration; and
   means for inhibiting said logic circuit means from providing said skid signal when the positive acceleration rate of the faster wheel attains a level representative of a second predetermined acceleration greater and more positive than that of said first predetermined acceleration.

2. A skid control system as set forth in claim 1 and wherein said means for inhibiting includes circuit means for varying said second predetermined acceleration rate in dependence upon the speed of the faster wheel.

3. A brake control system for a vehicle having at least first and second independently rotatable spaced apart wheels and having a braking system for applying braking forces to said wheels and comprising:
   brake control means responsive to a skid signal for controlling said braking system to release the braking forces on said wheels;
   means for providing first and second wheel speed signals having magnitudes respectively representative of the wheel speed of said first and second wheels;
   logic circuit means for providing a skid signal when the wheel speed signal for one of said wheels differs from that of the other said wheel by a predetermined amount;
   means for delaying application of said skid control signal to said brake control means to permit additional braking force to be applied for a limited time to said wheels so that the faster rotating wheel may have additional braking effect for slowing the vehicle; and
   means for varying said delay period in dependence upon the speed of the faster rotating wheel.

4. A skid control system for use with a vehicle having at least first and second spaced apart independently rotatable wheels and having a braking system for applying braking forces to said wheels and comprising:
   brake control means responsive to an applied skid signal for controlling said braking system to relieve the braking forces on said wheels;
   means for providing first and second wheel speed signals having magnitudes respectively representative of the wheel speeds of said first and second wheels;
   means for providing from said first and second speed signals an average wheel speed signal having a magnitude respectively representative of the average speed of said first and second wheels;
   first means for comparing said average wheel speed signal with a reference signal and providing a skid signal whenever the magnitude of the average signal is less than that of said reference signal;
   reference signal means for providing a reference signal which continuously decreases in magnitude as the speed of the faster wheel decreases and from an initial value representative of the speed of the faster wheel just prior to the time the faster wheel decreased in speed and at a decay rate initially representative of a first deceleration rate;
   said reference signal means including circuit means responsive to said skid signal to vary the decay rate of said reference signal from said first rate to a second rate representative of a slower rate of deceleration so that said reference signal continuously further decreases in magnitude as the speed of the faster wheel decreases;
   time delay means connected to the output circuit of said comparing means for delaying application of said skid signal to said brake control means; and
   means for adjusting said time delay in dependence upon the wheel speed of the faster wheel.

5. A skid control system for use with a vehicle having at least first and second spaced apart independently rotatable wheels and a braking system for applying braking forces to said wheels and comprising:
   braking control means responsive to a skid signal for controlling said braking system to release the braking forces on said wheels;
   means for providing first and second wheel speed signals having magnitudes respectively representative of the wheel speeds of said first and second wheels;
   logic circuit means for providing said skid signal when said wheel speed signal are decreasing in magnitude such that the average magnitude of said wheel speed signals is less than that of a predetermined reference;
   time delay means for delaying the time of applying said skid signal to said brake control means for a limited time duration so that the faster of said wheels may be braked for an additional period of time to slow the vehicle before the brake forces are released in response to the skid signal; and means for varying said time delay in dependence upon the speed of the faster wheel.

6. A skid control system for use with a vehicle having at least first and second spaced apart independently rotatable wheels and having a braking system for applying braking forces to said wheels and comprising:

brake control means responsive to an applied skid signal for controlling said braking system to relieve the braking forces on said wheels;

means for providing first and second wheel speed signals having magnitudes respectively representative of the wheel speeds of said first and second wheels;

means for providing from said first and second speed signals an average wheel speed signal having a magnitude representative of the average speed of said first and second wheels;

reference signal means for providing a reference signal which continuously decreases in magnitude as the speed of the faster wheel decreases and from an initial value representative of the speed of the faster wheel just prior to the time the faster wheel decreased in speed and at a first decay rate initially representative of a first deceleration rate;

first comparator means for comparing said average wheel speed signal with said reference signal and including means for initiating a skid signal in response to reduction of the magnitude of said average signal to below that of said reference signal while said reference signal was decreasing at said first decay rate;

said reference signal means including circuit means responsive upon initiation of said skid signal to change the decay rate of said reference signal from said first rate to a second rate representative of a slower rate of deceleration so that said reference signal continuously further decreases in magnitude;

said first means for comparing said average wheel speed signal with said reference signal including means for interrupting said skid signal in response to increase of the magnitude of said average signal to above said reference signal while said reference signal was decreasing at said second decay rate.

7. A skid control system as set forth in claim 6 wherein said reference signal means includes energy storage means for storing a signal having a magnitude representative of the magnitude of the speed of the faster wheel and energy discharge circuit means for discharging said energy storage means when the faster wheel speed signal decreases to a value less than the magnitude of the signal stored by said energy storage means, said discharge circuit means having first and second discharge paths to provide a rate of discharge in accordance with said first decay rate and switch means responsive to a said skid signal for deactivating one of said discharge paths so that said energy means discharges at a rate in accordance with said second decay rate.

8. A skid control system as set forth in claim 6 including acceleration detecting means for providing said skid signal when the rate of acceleration of the faster wheel exceeds a first positive acceleration level and is below a second positive acceleration level so that said brake control means and said reference signal means respond to the skid signal first provided by either said first comparing means or by said acceleration detecting means to respectively release said braking forces and vary the decay rate of said reference signal to said second decay rate.

9. A skid control system as set forth in claim 6 and further including second comparator means for comparing the deceleration rate of said faster wheel with a reference deceleration rate for providing a skid signal to said brake control means when the magnitude of the deceleration rate of said faster wheel exceeds the magnitude of said reference deceleration rate;

time delay means connected with the output of said first comparator means, at such a place as to delay application of said skid signal of said first comparator means to said brake control means but not to delay said skid signal of said second comparator means.

* * * * *

UNITED STATES PATENT AND TRADEMARK OFFICE
CERTIFICATE OF CORRECTION

PATENT NO. : 3,966,267
DATED : June 29, 1976
INVENTOR(S) : Joseph H. McNinch, Jr.; John A. Urban; Gary L. Hopkins It is certified that error appears in the above-identified patent and that said Letters Patent are hereby corrected as shown below:
But will apply to Grant only.
Columns 1, 2, 3, and 4 have been omitted from the printed patent.

Col. 8, line 14:     "delay" should be "decay".

Col. 9, line 32:     "us" should be "is".

Col. 9, line 63:     "and" should be "the".

Col. 10, line 50:    After "series" insert "circuit".

Signed and Sealed this

Fourteenth Day of September 1976

[SEAL]

Attest:

RUTH C. MASON
Attesting Officer

C. MARSHALL DANN
Commissioner of Patents and Trademarks